Oct. 4, 1966   R. J. GRAN ETAL   3,276,596
SAFETY FILTER DEVICE
Filed Aug. 22, 1963
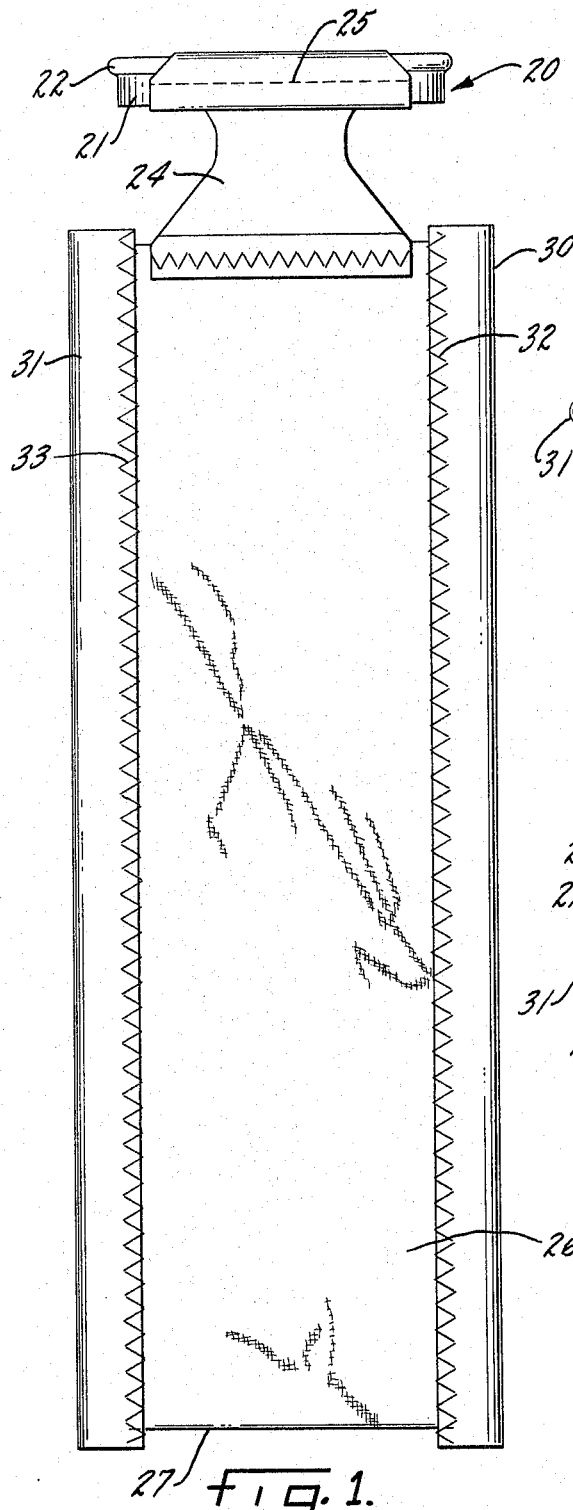
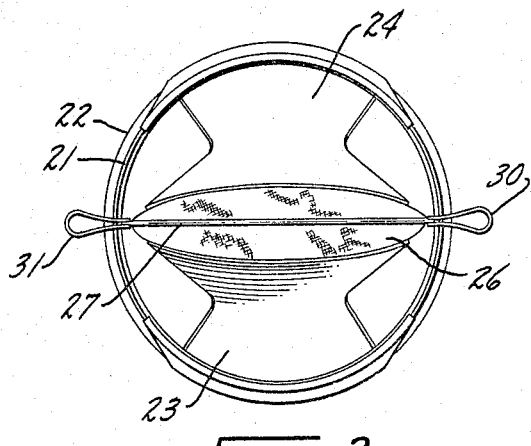
INVENTORS.
RAY J. GRAN
HAROLD H. HORWITZ
BY Parker & Carter
Attorneys.

though but parallel to each other, the scallops thereof are offset 90 degrees and thus do not align with the closure ears to interfere with their insertion.

United States Patent Office
3,276,596
Patented Oct. 4, 1966

3,276,596
SAFETY FILTER DEVICE
Ray J. Gran and Harold H. Horwitz, Chicago, Ill., assignors to All American Metal Spinning Company, Chicago, Ill., a partnership composed of Ray J. Gran and R. L. Ross
Filed Aug. 22, 1963, Ser. No. 303,900
4 Claims. (Cl. 210—472)

This invention relates to filters and has particular relation to a vehicle gasoline tank-filter combination.

One purpose is to provide a filter for vehicle gasoline tanks and the like.

Another purpose is to provide a filter of maximum simplicity.

Another purpose is to provide a filter of maximum economy in manufacture and use.

Another purpose is to provide a filter capable of rapid production in quantity.

Another purpose is to provide a filter effective for employment with vehicles already in use.

Another purpose is to provide a filter and vehicle gasoline tank filler neck combination wherein a filter of maximum simplicity and economy may be removably combined with said filler necks for guaranteed filtering of gasoline entering said tank prior to its entry thereinto.

Another purpose is to provide a filter which may be easily cleaned and readied for re-use.

Another purpose is to provide a filter which may be readily discarded and replaced with a like filter at minimum cost.

Another purpose is to provide a filter having pressure-dissipating means associated therewith.

Another purpose is to provide a filter assembly including suspension means effective to permit pressure escape.

Another purpose is to provide a filter having pressure-dissipating means, the said means having sufficient stiffness to facilitate insertion of the filter in use and having sufficient flexibility to permit conformation of the filter with portions of the vessel being filled.

Another purpose is to provide a filter having an unseamed portion through which fluid may flow.

Other purposes will appear from time to time during the course of the specification and claims.

The invention is illustrated more or less diagrammatically in the accompanying drawings wherein:

FIGURE 1 is a side elevation;

FIGURE 2 is a top plan view of the structure of FIGURE 1; and

FIGURE 3 is a bottom plan view of the structure of FIGURE 1.

Like parts are indicated by like numerals throughout the specification and drawings.

Referring now to FIGURE 1, a ring 20, which may be conveniently formed of a suitable plastic, has a circumferential wall portion 21 and a circumferential bead 22 along the upper edge of wall 21. Secured to the wall 21, at diametrically opposed points thereon, are a pair of suspension members 23, 24. The members 23, 24 may be conveniently secured to the ring 20 by stitching, such as that illustrated at 25. It will be observed that one end of each of the members 23, 24 is secured to an inner surface of the wall portion 21 and that the members 23, 24 are thereafter turned about the outer surface of the ring 20, over the bead 22 and downwardly below the ring 20, in overlying relationship with the end portion secured to the inner surface of wall 21. The suspension members 23, 24 have their side edges scalloped for purposes which will appear hereinbelow and have their opposite ends each secured to and along the opposite upper edges of a filter member 26.

The filter member 26 comprises a generally rectilinear elongated strip of cloth, or other suitable filter material, folded upon itself to form the unseamed curved bottom edge 27 and the opposed opposite upper edges 28, 29, the edge 28 being secured to the widened lower edge of suspension member 23 and the edge 29 being secured to the widened lower edge of suspension member 24.

Extending along the opposite lateral edges of the member 26, in consequent spaced relationship one with the other, are a pair of pressure-dissipating tubular elements 30, 31. As may be best seen in FIGURE 3, the tubular elements 30, 31 may be conveniently formed of a variety of plastic materials. The members 30, 31 are simultaneously formed and secured to member 26 by folding an elongated, rectilinear strip of such plastic material upon itself to place the opposite lateral edges thereof in overlapping relationship with the adjacent and opposed lateral edges of the member 26. While the lateral edges could be secured to the outer surfaces of the opposed lateral edges of members 30, 31, the arrangement shown provides an adequate seal and protection of filter edges against tearing or fraying. A single row of stitching, such as that illustrated at 32, 33, is then employed to simultaneously secure the opposite lateral edges of the member 26 together, as appears clearly in FIGURE 3. The resulting structure provides hollow passage members extending from a point adjacent, or preferably slightly below, the bottom edge 27 of member 26 to a point adjacent, and preferably slightly above, the upper edges 28, 29 of member 26. The material of elements 30, 31 is selected from among those materials effective to insure the formation of hollow passages therethrough upon the securing of the opposite lateral edges thereof as illustrated in FIGURES 1 and 3 and from materials unaffected by contact with gasoline.

The form of the invention illustrated in FIGURES 1–3 provides particular advantages under specific circumstances. The filter of FIGURES 1–3 is inserted into the filler neck of a vehicle tank (not shown). The tubular elements 30, 31 may conveniently be inserted, for example, through the notches normally provided in said such filler neck through which the ears of closure or cap (not shown) are later to be inserted, for example. Such insertion, further, aligns the pressure dissipating tubes 30, 31 with such notches in the neck and insures a clear passage to atmosphere for the area within the tank beneath the filter 26. The members 30, 31 are of sufficient rigidity to provide for ease of insertion of the filter 26 in the neck but further are of sufficient flexibility to provide for conformation of the member 26 with the filler neck, should the latter not be perfectly straight.

When the member 26 has been inserted a sufficient distance, the ring 20 is slipped over the upstanding portion of the filler neck to suspend and sustain the filter 26 in place. Normally the ring 20 will be pressed downwardly into contact with the portion of the vehicle surrounding the upstanding segment of the filler neck, the suspension members 23, 24 being of sufficient length and flexibility and being curved about the ring 20 to provide for such positioning of the ring 20. It will be understood that the members 23, 24 thus overlie the upper each of the filler neck and extend downwardly within the filler neck. Since the suspension members 23, 24 are of relatively thin center sections, the opposite lateral edges thereof being scalloped, a further assurance of clear passage to atmosphere for the area within the tank below filter 26 is provided. The members 23, 24 may be conveniently formed of a vinyl type plastic, for example, to insure repeated wear as a result of engagement thereof by the ears of a closure or cap. Since the members 23, 24 are normally offset 90 degrees from the openings through which the ears pass in entering the filler neck, the members 23, 24 may escape contact with the ears in those filler neck installations in which the ears of a closure or cap are turned less than 90 degrees after passing through the appropriate apertures.

While in place the filter of the invention produces no interference with the normal placement and removal of the cap or with the normal delivery of gasoline to the tank. While a vertically disposed filler neck is contemplated herein, it will be understood that the filter of the invention is usable with filler necks which may be inclined at a variety of angles, the engagement of the ring 20 serving to secure the suspenders 23, 24 to the upstanding neck portion and the tubular portion of the filter 26 extending within the filler neck.

As is generally known, some filler hose nozzles in common usage have a provision for automatic shut-off of the flow of gasoline therethrough in response to increased pressures within the tank. To insure against a misleading indication of such increased pressures, the members 30, 31 (of which one may be employed without departing from the scope of the invention) are effective to maintain the area within tank beneath filter 26 in communication with atmosphere and to preserve, unencumbered, the normal operation of such filler nozzles, as well as to facilitate the flow of gasoline through the sides and lower end of filter 26.

Whereas there have been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

What is claimed is:

1. A filter assembly comprising a ring, a pair of generally diametrically opposed suspender elements carried by said ring and extending downwardly therefrom, a filter member formed of filter material, said filter member having a curved, unseamed bottom surface, and a pair of opposite end edges, said end edges each being secured to one of said suspender members, and at least one pressure-dissipating member, said pressure-dissipating member comprising a hollow tubular element secured to and extending throughout the length of said filter member.

2. A filter comprising an elongated strip of filter material, said strip being folded upon itself to bring its opposite longitudinal edges in opposed relation one to the other, a ring, suspender members secured to said ring and to said opposite longitudinal edges to suspend said folded strip from said ring, the opposite lateral edges of said strip being secured to each other and carrying, in outwardly extending relationship therewith, a hollow tubular element open at its opposite ends and formed and adapted to convey pressure from the area beyond one end of said filter to the area beyond the opposite end of said filter.

3. A filter comprising an elongated strip of filter material, said strip being folded upon itself to bring its opposite longitudinal edges in opposed relation one to the other, a ring, suspender members secured to said ring and to said opposite longitudinal edges to suspend said folded strip from said ring, the opposite lateral edges of said strip being secured to each other and carrying, in outwardly extending relationship therewith, a hollow tubular element open at its opposite ends and formed and adapted to convey pressure from the area beyond one end of said filter to the area beyond the opposite end of said filter, said suspender members being circumferentially offset approximately 90 degrees from said hollow tubular element with respect to said ring.

4. A filter comprising an elongated strip of filter material, said strip being folded upon itself to bring its opposite longitudinal edges in opposed relation one to the other, a ring, suspender members secured to said ring and to said opposite longitudinal edges to suspend said folded strip from said ring, the opposite lateral edges of said strip being secured to each other and carrying, in outwardly extending relationship therewith, a hollow tubular element open at its opposite ends and formed and adapted to convey pressure from the area beyond one end of said filter to the area beyond the opposite end of said filter, said suspender members being secured to an inner surface of said ring and being curved about the lower edge, the outer surface and the upper edge of said ring, said suspender members thereafter extending downwardly below and within the area encompassed by said ring.

References Cited by the Examiner

UNITED STATES PATENTS

| | | | |
|---|---|---|---|
| 217,906 | 7/1879 | Shaler | 210—460 |
| 432,870 | 7/1890 | Gralike | 210—472 X |
| 1,095,494 | 5/1914 | Edey | 210—474 X |
| 1,177,277 | 3/1916 | Schaub | 210—172 |

FOREIGN PATENTS

| | | |
|---|---|---|
| 680,796 | 9/1939 | Germany. |
| 20,761 | 1913 | Great Britain. |
| 356,458 | 9/1931 | Great Britain. |

REUBEN FRIEDMAN, *Primary Examiner.*

D. M. REISS, *Assistant Examiner.*